United States Patent
Baum et al.

(10) Patent No.: US 6,385,462 B1
(45) Date of Patent: May 7, 2002

(54) METHOD AND SYSTEM FOR CRITERION BASED ADAPTIVE POWER ALLOCATION IN A COMMUNICATION SYSTEM WITH SELECTIVE DETERMINATION OF MODULATION AND CODING

(75) Inventors: Kevin Lynn Baum, Rolling Meadows; Brian Keith Classon, Streamwood; Philippe Jean-Marc Sartori, Schaumburg; Theresa Ann Fry, Lake Zurich, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/579,984

(22) Filed: May 26, 2000

(51) Int. Cl.⁷ .......................... H04Q 7/20; H04B 15/00; H04B 1/00; H04B 17/00

(52) U.S. Cl. ...................... 455/522; 455/69; 455/67.3; 455/63

(58) Field of Search ............................. 455/13.4, 38.3, 455/62, 63, 67.1, 67.3, 69, 421, 423, 424, 450, 455, 452, 522, 44; 375/342; 370/342

(56) References Cited

U.S. PATENT DOCUMENTS

| B16,198,734 B1 | * | 1/1997 | Edwards et al. ............. 370/347 |
| 5,764,699 A | * | 6/1998 | Needham et al. ........... 375/261 |
| 5,812,938 A | * | 9/1998 | Gilhousen et al. ............ 455/69 |
| 5,839,056 A | * | 11/1998 | Hakkinen ..................... 455/69 |
| 5,991,329 A | | 11/1999 | Lomp et al. |

FOREIGN PATENT DOCUMENTS

GB     2 298 338 A  *  8/1996   ........... H04B/17/00

OTHER PUBLICATIONS (0–7803–4323–9/98), 1998 IEEE Adaptive Coding and Modulation in an OFDM–TDMA Communication System.*
Matsuka et al. "Adaptive Modulation system with variable coding rate concatenated for high quality multi–media communication systems", 1996 IEEE, Osaka 565 Japan; pp. 487–492.*
Distributed Conchannel Interference Control in Cellular Radio Systems by J. Zander, IEEE Trans. Vehicular Tech., vol. 41, No. 3, Aug. 1992.

(List continued on next page.)

*Primary Examiner*—Lester G. Kincaid
*Assistant Examiner*—Meless Zewdu
(74) *Attorney, Agent, or Firm*—Steven A. May (57) ABSTRACT

A method and system (102) for providing criterion based adaptive power allocation with selective determination of modulation and coding is provided. A method is presented which consists of providing adaptive power allocation with a target signal quality for each link based on a system criterion, and a modulation/coding rate for each link based on a signal quality associated with the transmit power of each link. A further method is provided which may alternatively, or additionally, consist of APA in which the transmit power for each link is assigned in an attempt to obtain a signal quality for each link within a range between or equal to a minimum and maximum. An additional method is disclosed consisting of APA in which the transmit power for each link is assigned in an attempt to obtain a signal quality for each link as close as possible to a common signal quality, when the power allocation method has a limited dynamic range. The method and system (102) of the present invention may be implemented in a wireless communication system (100) in any number of formats, such as code division multiple access or time division multiple access.

20 Claims, 4 Drawing Sheets

OTHER PUBLICATIONS

A Simple Distributed Autonomous Power Control Algorithm and its Convergence, by G. Foschini and Z. Miljanic IEEE Trans. On Vehicular Tech., vol. 42, No. 4, Nov. 1993.

Variable–Rate Variable–Power MQAM for Fading Channels, by A. Goldsmith and S. Chua, IEEE Trans. Comm., vol. 45, No. 10, Oct. 1997.

Performance of Optimum Transmitter Power Control in cellular Radio Systems, by J. Zander, IEEE Trans. Vehicular Tech., vol. 41, No. 1, Feb. 1992.

IEEE Transactions on Communications, "On the Performance of Adaptive Modulation in Cellular Systems"; vol. 47, No. 6, Jun. 1999; pp. 884–895.

H. Matsuoka, S. Sampei, N. Morinago, and Y. Kamio, Adaptive Modulation System with Variable Coding Rate Concatenated Code for High Quality Multi–Media Communication System, VTC '96, pp. 487–492, Apr. 1996.

H. Rohling, R. Grunheid, Adaptive Coding and Modulation in an OFDM–Tdma Communication System, VTC '98, May 1998.

W. T. Webb and R. Steele, "Variable Rate QAM for Mobile Radio", IEEE Transactions on Communications, vol. 43, No. 7, Jul. 1995, pp. 2223–2230.

S. Otsuki, S. Sampei and N. Morinago, "Square–QAM Adaptive Modulation/TDMA/TDD Systems Using Modulation Level Estimation with Walsh Function", Electronics Letters, vol. 31, No. 3, Feb. 1995, pp. 169–171.

J.M. torrance and L. Hanzo, Upper Bound Performance of Adaptive Modulation in a Slow Rayleigh Fading Channel, Electronics Letters, vol. 32, No. 8, Apr. 1996, pp. 718–719.

Y. Kamio, S. Sampei, H. Sasaoka and N. Morinago, Performance of Modulation–level–controlled Adaptive–modulation Under Limited Transmission Delay Time for Lane Mobile Communications, Proceedings of the $45^{th}$ IEEE Vehicular Technology Conference, Chicago, IL, Jul. 1995, pp. 221–224.

* cited by examiner

METHOD AND SYSTEM FOR CRITERION BASED ADAPTIVE POWER ALLOCATION IN A COMMUNICATION SYSTEM WITH SELECTIVE DETERMINATION OF MODULATION AND CODING

BACKGROUND OF THE INVENTION

The present invention relates generally to a method and system for providing adaptive power allocation with selective determination of modulation and coding in a communication system and, more particularly, to a method and system for providing adaptive power allocation with adaptive modulation/coding which provides flexibility to modify the adaptive power allocation method to achieve one or more desired system criteria.

In systems with power control capability, the power of a transmitted signal can be adjusted in order to meet a target signal quality, such as carrier to interference (C/I) ratio or carrier to interference plus noise (C/(Noise+I)) ratio, at the receiver. In such a system, the transmit power will typically be low when a user is close to a base station and will increase with distance from the base station. Unfortunately, with this prior method, a compromise is made between coverage reliability and system capacity. If the system uses a robust form of modulation, such as Binary Phase Shift Keying (B-PSK), good coverage reliability can be obtained, but the system capacity and data rate may be lower than is desired. If, in an attempt to increase data rate and capacity, the system uses a more aggressive form of modulation, such as 8-PSK, the higher C/I requirement cannot be met for all of the users. As a result coverage reliability may be significantly reduced.

Accordingly, there is a need for a method and system which implement adaptive power allocation which achieve relatively high system capacity and system coverage, which provide adaptive modulation/coding capabilities and which provide flexibility to modify the adaptive power allocation method to achieve a number of different system criteria.

BRIEF DESCRIPTION OF THE DRAWINGS

The foregoing and other advantages of the invention will become apparent upon reading the following detailed description and upon reference to the drawings in which.

DETAILED DESCRIPTION OF THE PREFERRED EMBODIMENTS

In accordance with the present invention, a method and system provide adaptive power allocation with selective determination of modulation/coding rate. A method for transmitting signals in a communication system comprises determining a reference transmit power and an associated reference signal quality for each of the planned links. A target signal quality is determined for each of the planned links based on a system criterion, and a transmit power is assigned to each of the planned links such that each signal quality is as close as possible to its corresponding target signal quality. A modulation/coding rate is selected for each of the planned links based on a signal quality associated with the transmit power assigned to the link. The signal quality associated with the transmit power is the anticipated received signal quality from the link if the transmit power were assigned to that link. This signal quality can be found from the reference transmit power, the reference signal quality, and the assigned transmit power. If the transmit power assigned to a planned link is such that the signal quality of the link matches its target signal quality, then the modulation/coding rate is selected based on the target signal quality. Each of the planned links is transmitted with the desired modulation/coding rate and at the assigned transmit power. In one aspect of the invention, a common target signal quality is determined for all of the planned links, and a common modulation/coding rate is determined for all of the planned links based on the common target signal quality. As used herein, a planned link can be either a new link that the system may attempt to establish and serve with some portion of system resources, or an existing link that the system may attempt to serve with some portion of system resources. Examples of system resources include, but are not limited to, transmit power and channel resources such as time slots, frequency slots, and spreading codes.

As used herein, a system criterion can be any optimization of a performance measure, based on one or more factors, that includes the set of the planned links. For example, the system criterion can be to maximize the coverage, the coverage being the fraction of planned links that are served with a strictly positive modulation/coding rate (MCR), or a MCR which is greater than zero. Another example system criterion is to have all the planned links use a common MCR while maximizing the total system capacity. Other possible system criteria can be to minimize the signal quality differences between the planned links, to minimize, or to maximize, the number of users with the highest MCR, or to improve the performance of a system with a limited power control range. In this last case, if an ideal but impractical power control method has an optimal C/I target of $(C/I)_{opt}$, a system criterion in the present invention can be to minimize the expression $$\sum_{j \in \{users\}} |(C/I)_j - (C/I)_{opt}|.$$

According an aspect of the present invention, two system criteria may be combined with one system criterion being used as a primary system criterion and the other system criterion as a secondary system criterion. For example, the primary system criterion may be to maximize coverage and the secondary system criterion to maximize the total system capacity. In this case, the system determines first what the maximum coverage may be, and then selects a combination of parameters that maximizes the total system capacity over the set of all possible combinations of parameters that maximize the coverage.

It should be understood that a system criterion is not restricted to the examples previously given. It should also be understood that, whereas the combination of two system criteria is described here, this is not a limitation, and that any finite number of system criteria can be combined.

In accordance with another aspect of the present invention, a method for transmitting signals comprises determining a reference transmit power and an associated reference signal quality for each of the planned links. A target signal quality is determined for each of the planned links based on a system criterion. A minimum and a maximum desired signal quality are then determined for the planned links based on one or more system criteria. A transmit power is set for each of the planned links based on the target signal quality of each of the planned links and the minimum and maximum desired signal qualities. A modulation/coding rate is selected for each of the planned links, based on a signal quality associated with the transmit power of the link.

In accordance with yet another aspect of the present invention, in a wireless communication system, a system for transmitting signals is provided. The system comprises a transmit power unit for determining a reference transmit power for each of the planned links. A signal quality unit determines a reference signal quality for each of the planned links, and determines a target signal quality for each of the planned links based on the reference signal quality of each link and one or more system criteria. The transmit power unit further determines a transmit power for each planned link based on the reference transmit power and the target signal quality of the link. A modulation/coding rate unit assigns a modulation/coding rate to each planned link based on a signal quality associated with the transmit power of the planned link. In another aspect of the invention, the signal quality unit determines a common target signal quality for all planned links, and the modulation/coding rate unit assigns a common modulation/coding rate, denoted as MCR, to all planned links. A transceiver unit transmits each of the planned links at the transmit power with the selected modulation/coding rate.

In a communication system, a method and system in accordance with the present invention provide adaptive power allocation with system level adaptive modulation/coding capability. Accordingly, the method of the present invention dynamically selects a modulation/coding format, or modulation/coding rate (MCR), for all users, at the system level. The MCR is the number of information bits that can be represented by a single symbol. For example, a 16 QAM modulation format with rate 1/2 coding would have a MCR of 2 information bits per symbol, or a BPSK modulation format with no coding would have a MCR of 1 information bit per symbol.

Figure 1:
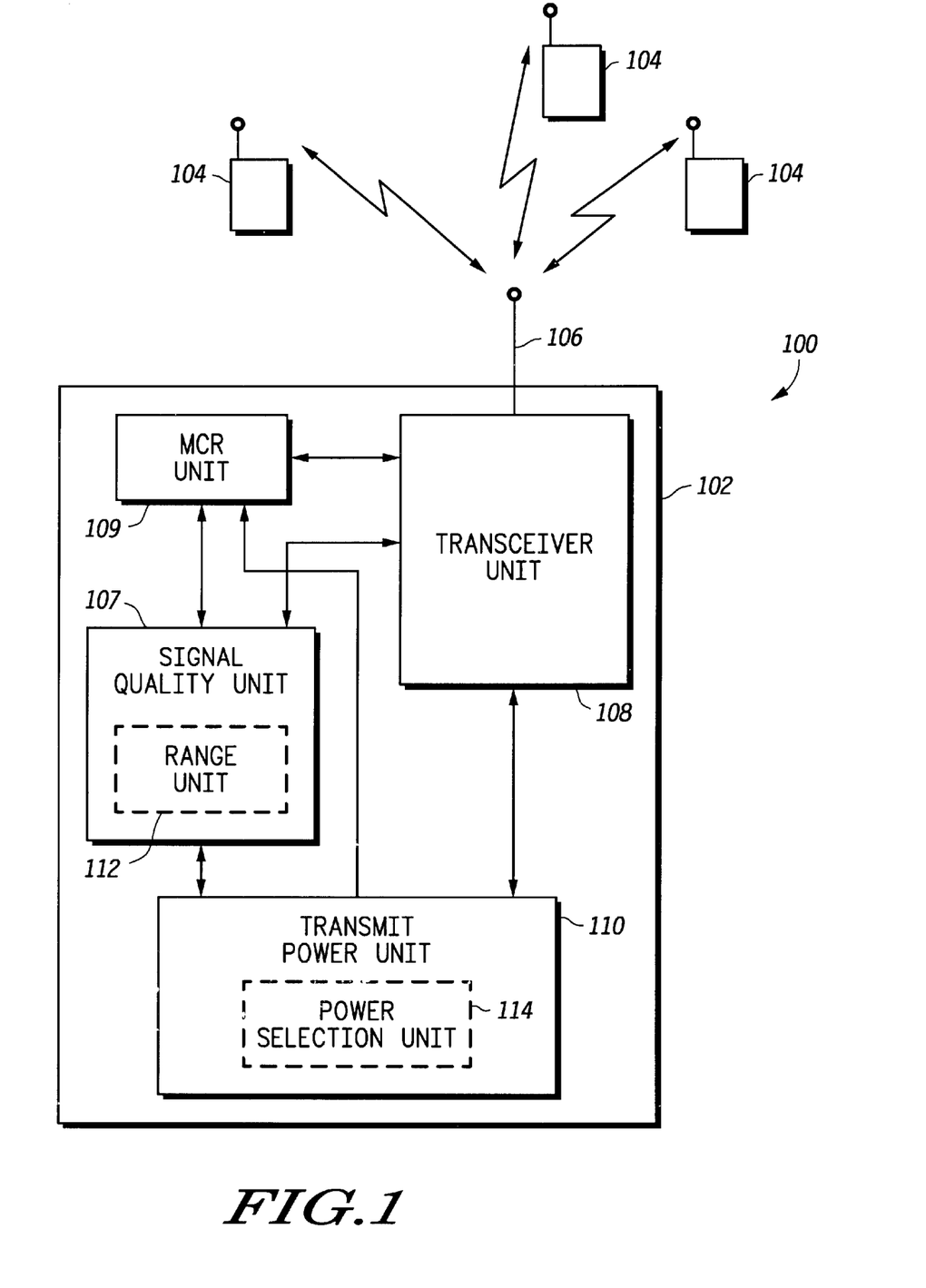
FIG. 1 is a block diagram of a communication system in accordance with the present invention.

FIG. 1 is block diagram of an exemplary communication system 100 in which a system 102 providing APA with adaptive modulation/coding (AMC) in accordance with the present invention may be advantageously implemented. Although the communication system 100 is shown as a wireless communication system, it should be understood that the present invention may be advantageously implemented in other types of communication systems.

The system 102, which is shown as a base station, communicates over radio links with a plurality of mobile units 104. Communications from the system 102 to the mobile units 104 are referred to as downlink communications, and communications from the mobile units 104 to the system 102 are referred to as uplink communications. The system 102 has an antenna 106 and a transceiver unit 108 for transmitting signals to and receiving signals from the mobile units 104. The transceiver unit 108 transmits each of the planned links at its associated transmit power, with a selected modulation/coding rate for each of the planned links. The communications between the mobile units 104 and the system 102 may be in any desired format, such as code division multiple access (CDMA), time division multiple access (TDMA), frequency division multiple access (FDMA) or any combination of these formats, or other multiple access schemes.

A transmit power unit 110 determines a reference transmit power for each of the planned links. A signal quality unit 107 determines a reference signal quality for each of the planned links. One method for supporting the determination of the reference signal quality of a planned link is to use feedback from a mobile unit 104 associated with the planned link. In one example, a mobile unit measures a received signal quality of a known or pilot signal transmitted by the transceiver unit 106 and then transmits the measured quality back to the transceiver 106. The transceiver 106 then passes the measured quality information to the signal quality unit 107, and the signal quality unit 107 determines the reference signal quality of the planned link.

The signal quality unit 107 also determines a target signal quality for each of the planned links based on one or more system criteria. The transmit power unit 110 determines a transmit power for each planned link based on the target signal quality and the reference transmit power, and the reference signal quality. A modulation/coding rate unit 109 assigns a modulation/coding rate to each of the planned links based on a signal quality associated with the transmit power assigned to the link. In one aspect of the invention, the signal quality unit 107 determines a common target signal quality for all of the planned links, and the modulation/coding rate unit 109 assigns a common MCR to all links. In accordance with another aspect of the present invention which will be disclosed more fully below, a range unit 112 determines minimum and maximum desired signal qualities, such as minimum and maximum desired carrier to interference ratios, for the planned links and determines a target signal quality for each of the planned links based on one or more system criteria. The power selection unit 114 selects a transmit power for each of the planned links based on the minimum and maximum desired signal qualities and the target signal quality of each of the planned links.

In accordance with another aspect of the present invention, a power selection unit 114 selects the transmit power from a set a possible transmit powers. The difference between the greatest possible transmit power value and a smallest strictly positive transmit power, expressed in dB, is called the dynamic range Although the difference is expressed in dB, the minimum strictly positive transmit power is a smallest transmit power greater than zero expressed in linear terms. If the target signal quality of one of the planned links is less than or equal to the minimum desired signal quality, the power selection unit 114 selects the transmit power to be the smallest possible transmit power that ensures that the signal quality for the one of the planned links, when transmitted, is greater than or equal to the minimum desired signal quality.

If the target signal quality of the one of the planned links is greater than or equal to the maximum desired signal quality, then the dynamic range of the power selection unit 114 is checked. If the dynamic range is large enough, then the power selection unit 114 sets the transmit power for the one of the planned links to the largest possible transmit power such that the signal quality of the one of the planned links when transmitted is lower than or equal to the maximum desired signal quality. On the other hand, if the dynamic range of the power selection unit 114 is not large enough to set the transmit power for the one of the planned links to a strictly positive possible value such that the signal quality of the one of the planned links when transmitted is lower than or equal to the maximum desired signal quality, then the power selection unit sets the transmit power to the minimum strictly positive possible transmit power. If the target signal quality of the one of the planned links is greater than the minimum desired signal quality and less than the maximum desired signal quality, the power selection unit 114 sets the transmit power for the one of the planned links such that the signal quality of the one of the planned links is as close as possible to the target signal quality.

In accordance with another aspect of the invention, if there is not enough dynamic range to set the transmit power of a planned link such that the signal quality of the planned link, when transmitted, is greater than or equal to the minimum desired signal quality, then that planned link is removed from the set of planned links.

Some of the described methods may result in excess transmit power remaining after each planned link is assigned resources. This excess transmit power may be reassigned based on some secondary system criterion. Examples of secondary criteria are interference reduction, capacity maximization, and maximization of system coverage.

It should be understood that signal quality may be determined by any number of signal characteristics, such as carrier to interference ratio (C/I), bit error rate (BER), word error rate (WER), carrier to interference plus noise and distortion (C/I+Noise+Distortion)), or the ratio of wanted to unwanted signal energy at the output of a detector in a receiver. Although the following descriptions of preferred embodiments of the present invention will be applied mainly to C/I, it should be understood that the present invention is not so limited and may apply to any signal quality characteristic.

Figure 2:
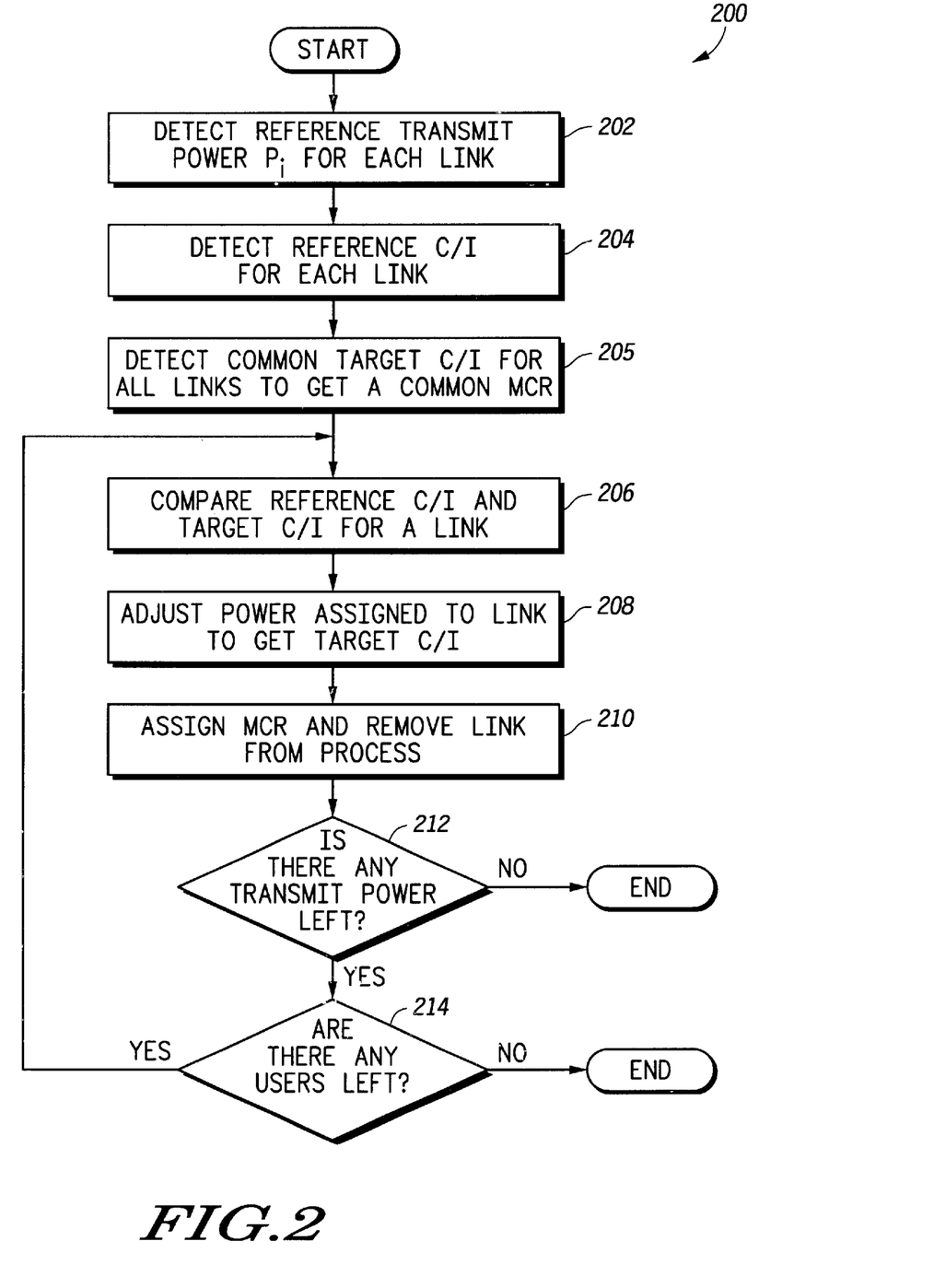
FIG. 2 is a flowchart of a method in accordance with the present invention having adaptive power allocation (APA) with system level adaptive modulation/coding.

In FIG. 2, a method 200 in accordance with one aspect of the present invention is shown in flowchart format. In the method with APA and system level AMC, all links use a common modulation/coding format, so they all have the same post-power allocation C/I, or post power-allocation signal quality requirement. The process of power allocation is as follows:

1. In step 202, assume there are N users, or planned links, and that each user is assigned an equal transmit power. This equal transmit power is called the reference transmit power.
2. Determine a reference C/I, or signal quality, of each user, in step 204, using the reference transmit power previously assigned. The reference C/I of user i is denoted as $(C/I)_i$.
3. Determine a common target C/I for all users, $(C/I)_{target}$ based on the reference C/I's of all of the users, and on a system criterion, and determine the common MCR to be used by all the users in the cell in step 205.
4. In step 206, the reference C/I of the user is compared to $(C/I)_{target}$.
5. The power assigned to the user is adjusted in step 208 so that the C/I after power allocation equals $(C/I)_{target}$. Thus, the power $P_i$ assigned to the $i^{th}$ user is given by:

$$P_i = \frac{P_T}{N} \frac{(C/I)_{target}}{(C/I)_i}, \quad (1)$$

where $P_T$ is total transmit power. Note that $P_T/N$ is the power that would be allocated to each user in a system without adaptive power allocation.
6. This user is then assigned a modulation/coding rate based on the target C/I, and removed from the process in step 210.
7. It is then determined whether any transmit power or channel resources remain to be assigned in step 212. If none remains or if there is not enough remaining transmit power to perform step 208, the process ends.
8. If there are no more users to serve, at step 214 the process ends. Otherwise, return to step 206.

One example of a power allocation strategy is to simultaneously exhaust all channel resources and all transmit power. This power allocation strategy results in the following constraint:

$$\sum_{i=1}^{N} P_i = P_T. \quad (2)$$

This power allocation strategy could be considered optimal because it results in a higher capacity than a similar strategy that does not simultaneously exhaust channel resources and transmit power. Therefore, the target C/I can be expressed by the following:

$$(C/I)_{opt} = (C/I)_{target} = \frac{N}{\sum_{i=1}^{N} \frac{1}{(C/I)_i}}. \quad (3)$$

Now, since all users have the same $C/I=(C/I)_{opt}$ after power allocation, each link has the same capacity and the total system capacity of adaptive power allocation with system level adaptive modulation/coding is N times the individual link capacity. For example, if a modified Shannon limit expression is used to model the link capacity, the total system capacity can be expressed in a bandwidth-normalized form as:

$$\eta_{APA\_SAMC} = \sum_{i=1}^{N} \eta_i = \frac{1}{N} \sum_{i=1}^{N} \log_2\left(1 + \alpha\left(\frac{C}{I}\right)_{opt}\right) = \log_2\left(1 + \alpha\left(\frac{C}{I}\right)_{opt}\right). \quad (4)$$

The degradation term α is less than or equal to one and degrades performance by 10 log(1/α)dB compared to the ideal Shannon limit. The value of the degradation term α may be chosen to approximate the performance of practical MCR methods and to model the effects of fast fading on the link performance. The system capacity can also be expressed in terms of the reference C/I values:

$$\eta_{APA\_SAMC} = \log_2\left(1 + \frac{\alpha N}{\sum_{i=1}^{N} \frac{1}{(C/I)_i}}\right). \quad (5)$$

Because a common target C/I is used in this method, any remaining transmit power may simply not be transmitted.

Figure 3:
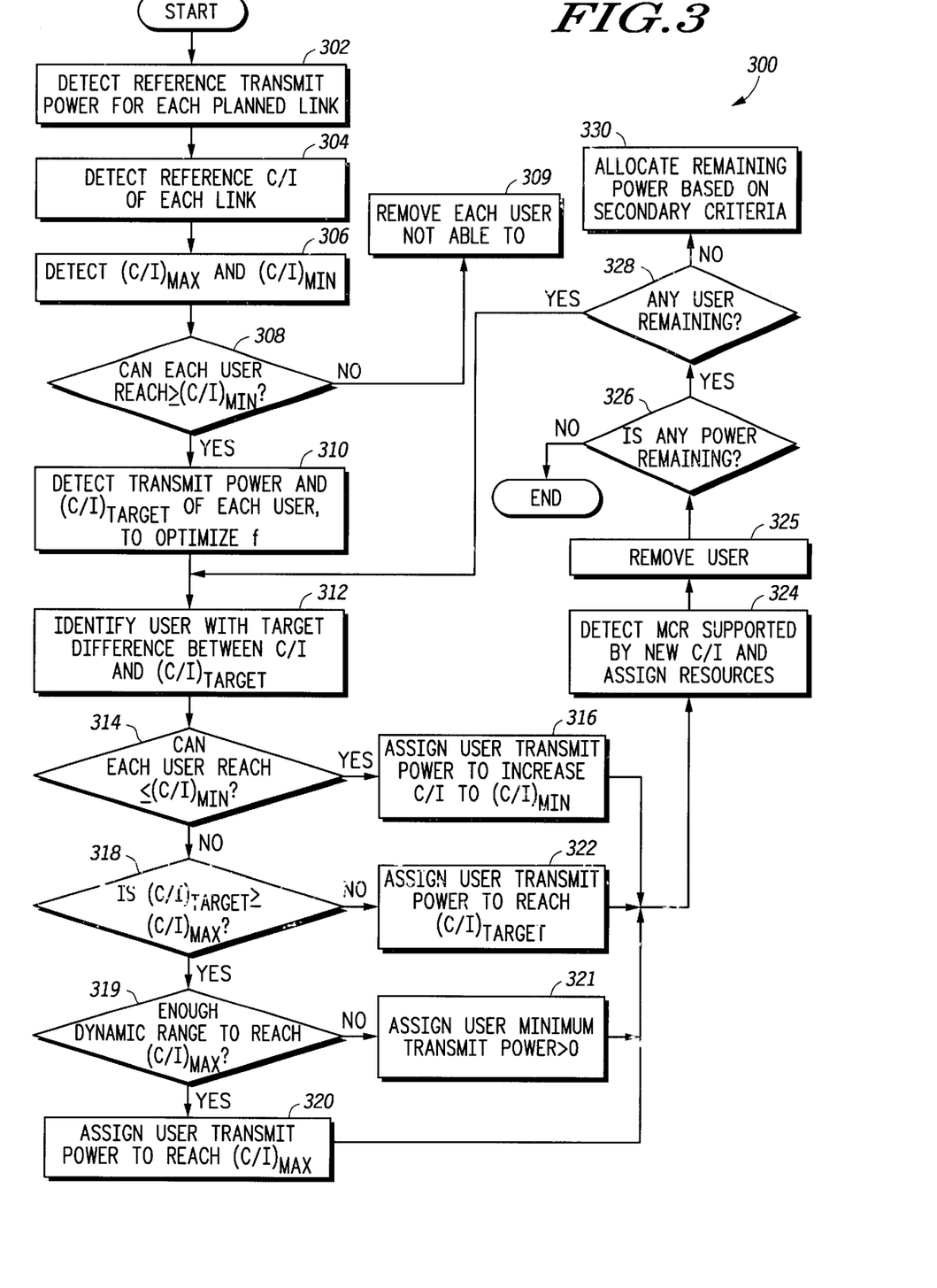
FIG. 3 is a flowchart of a method having APA in which the transmit power for each link attempts to obtain a signal quality for each link in a range between or equal to a minimum and maximum desired signal quality.

In accordance with the present invention, a method 300 is illustrated in FIG. 3 in which a continuous interval of possible signal quality values, determined by a minimum desired signal quality, such as a minimum desired carrier to interference ratio $(C/I)_{min}$, and a maximum desired signal quality, such as a maximum desired carrier to interference ratio $(C/I)_{max}$, is permitted. This aspect of the present invention attempts to set each link's transmit power such that each link's post-allocation C/I is in the interval $[(C/I)_{min};(C/I)_{max}]$. Then, the MCR is adapted for each link according to its post allocation C/I, in order to increase system capacity.

In accordance with one aspect of the invention, a system criterion, represented as a function $f$, is optimized over the whole set of users. For instance, the function $f$ can be the total system capacity, or the number of users having the highest achievable data rate. In general, the method 300 in accordance with one aspect of the present invention is comprised of the following steps:
1. In step 302, assume there are N users, or planned links, and that each user is assigned an equal transmit power.
2. Determine the reference C/I of each user, in step 304.
3. In step 306, determine $(C/I)_{max}$ and $(C/I)_{min}$.
4. For each user in step 308, determine whether a power control method enables the user to reach a C/I at least equal to $(C/I)_{min}$. All users that are unable to reach this C/I level are removed from the system at step 309.
5. For the users still remaining in step 310, determine the transmit power and the $(C/I)_{target}$ of each user so that a cost function $f$ is optimized (Note that each user may have a different value of $(C/I)_{target}$).
6. Identify the user having the largest $C/I-(C/I)_{target}$ remaining in the group in step 312.
7. If $(C/I)_{target} \leq (C/I)_{min}$, at step 314 assign the identified user the transmit power that will increase the user's C/I to $(C/I)_{min}$ in step 316. If $(C/I)_{target} \geq (C/I)_{max}$ at step 318, check if a power control method allows the user to have a C/I below $(C/I)_{max}$ at step 319, and if so then allocate the smallest transmit power that will give the user a C/I less than or equal to $(C/I)_{max}$ in step 320. If the power control method does not allow the user to have a C/I below $(C/I)_{max}$, allocate the minimum strictly positive possible transmit power in step 321. If $(C/I)_{min} < (C/I)_{target} < (C/I)_{max}$, then in step 322, allocate the transmit power that will change the user's C/I to $(C/I)_{target}$.
8. Determine the MCR that can be supported by the user's new C/I, which is associated with the transmit power assigned to the user, and assign the channel resources accordingly at step 324.
9. Remove the user from the group in step 325.
10. Determine at step 326 whether there is any power remaining to be allocated. If not, end the process.
11. If there is power remaining, determine if any users remain in the group at step 328. If there are no users remaining, then the remaining power and channel resources may be allocated based on one or more secondary system criteria in step 330.
12. If there are users remaining in the group, the process returns to step 312.

Figure 4:
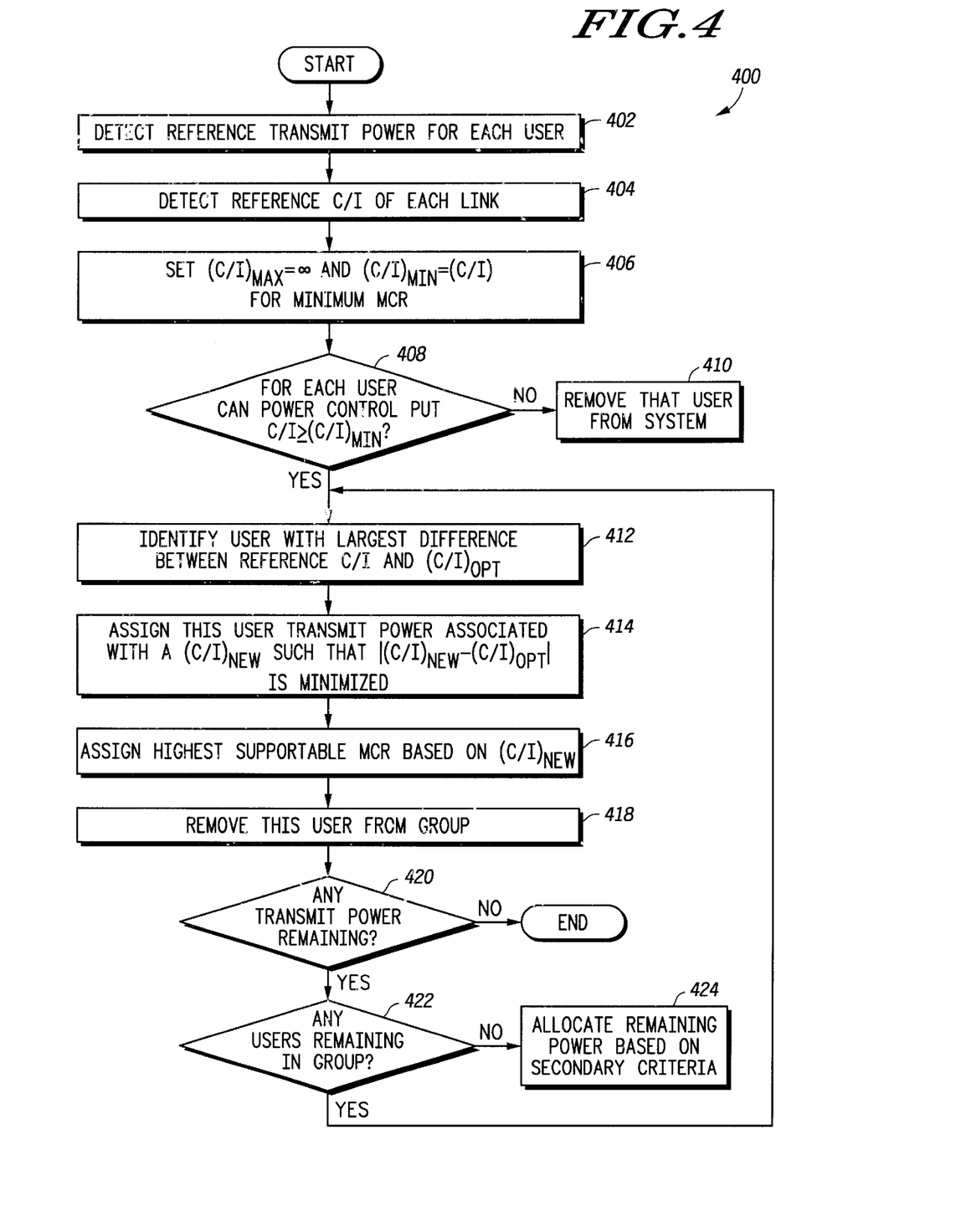
FIG. 4 is a flowchart of a method having APA in which the transmit power for each link attempts to obtain a signal quality for each link with a limited power control dynamic range.

In accordance with another aspect of the present invention, a method 400 is shown in FIG. 4 which improves the efficiency of power allocation or power control when the dynamic range is limited. For the method 400, the criterion is to minimize a cost function $f$, which is defined as $$\sum_{j \in \{users\}} |(C/I)_j - (C/I)_{opt}|,$$

where $(C/I)_j$ is the post-power allocation (C/I) for user j (also denoted as $(C/I)_{new}$ for a specified user) and $(C/I)_{opt}$ is the target (C/I), which may be obtained using Equation (3). A set of MCRs is available in the system. The method 400 is as follows:
1. At step 402, each user is assigned the same transmit power. This is the reference transmit power.
2. Determine the reference C/I of each user in step 404.
3. In step 406, $(C/I)_{max}$ is set to infinity and $(C/I)_{min}$ is set to the value that corresponds to a minimum (nonzero) MCR.
4. At step 408, for each user, determine whether the dynamic range of the power control algorithm is sufficient to reach a value greater than or equal to $(C/I)_{min}$. If not, remove that user from the system in step 410.
5. Identify in step 412 the user having the largest difference between its reference C/I and the $(C/I)_{opt}$.
6. In step 414, assign this user transmit power so that $|(C/I)_{new}-(C/I)_{opt}|$ is minimized. Here, $(C/I)_{new}$ is the C/I after power allocation. Note that each user may have a different value of $(C/I)_{new}$.
7. In step 416, assign to this user the highest supportable MCR based on the post-allocation C/I, $(C/I)_{new}$.
8. Remove the user from the group in step 418.
9. Determine at step 420 whether there is any transmit power remaining to be allocated. If not, end the process.
10. If there is transmit power remaining, determine if any users remain in the group at step 422. If there are no users remaining, then the remaining power and channel resources may be allocated based on one or more secondary system criteria in step 424.
11. If there are users remaining in the group, the process returns to step 412.

The adaptation of the modulation/coding rate in accordance with the present invention is implemented to take advantage of the imperfections of the power control to increase the system capacity. Note that a different expression for $(C/I)_{opt}$ or $f$ could also be derived and used in the method 400.

In accordance with yet another aspect of the present invention, a method is provided in which practical APA is combined with secondary AMC and an arbitrary signal quality target. The method is a variation of the previous method, where the optimum C/I, $(C/I)_{opt}$, is replaced with a different signal quality target $(C/I)_{req}$. For example, a system that was designed to use a fixed MCR and adaptive power allocation could be upgraded to this method by introducing multiple MCRs and using the C/I required for the old fixed MCR system as the target signal quality.

The methods described above typically use a finite set of MCRs, and therefore may have excess transmit power on some links. This excess transmit power may be redistributed to increase the MCRs of certain links to improve capacity or coverage reliability.

The present invention is not limited to one time procedures. The present invention may accommodate admission and removal of links and time-varying signal quality, due to movement of the users, changes in interference, or changes in the propagation environment. As examples, various methods in accordance with the present invention for accommodating these effects are set forth below.

The admission and removal of links and time-varying signal quality may preferably be addressed by periodically re-performing the link adaptation procedure of the present invention. For example, link adaptation may be performed once every frame in a TDMA or CDMA system. In such a case, the planned links would be determined for each frame (based on the links from the previous frame and any admissions/removals for the current frame) and the link adaptation procedure would be applied as if all of the planned links were new links in the frame. This approach is effective and it provides a very straightforward implementation. A variation on this preferred approach is to use the current power levels of the current links as initial values for the next frame in the link adaptation procedure.

Link adaptation may also be performed upon removal of a link. A link may be removed when a user either sends a termination call message or hands-off to another cell. When the link is terminated, the system resources that were assigned to that link are now excess system resources. Depending on the radio resource management procedures used by the network, different solutions for handling this situation are available. For example, the system can re-initialize the power and channel resource assignments, applying any of the methods previously described. As another alternative, the excess resources can be kept unused to allow the future admission of new users and also reduce system interference. Additionally, the excess system resources can be assigned to a user waiting for call admission. If the available excess resources are not assigned to a new user, the excess resources can be given to another current link or distributed among the current links based on a system criterion (e.g. to increase data rates or system capacity).

The admission of a new user may be performed in accordance with the following procedure. When the network receives an admission request, the system checks if there are free system resources available. If yes, different admission policies can be chosen. Compared with the users already active in the cell, the new user can be treated as an equal, having a low priority, having a medium priority or having a high priority.

If the new user has an equal priority, the link adaptation method is re-run on the whole set of planned links. If the new user has a low priority, the system allows the new user only if enough excess power is available to give the user a C/I equal to the user's target C/I. Otherwise the access request is denied or delayed. This means that in adaptive power allocation with a common, system level target C/I, the new user must be able to achieve the common $(C/I)_{target}$ with the excess transmit power, and with the other methods the user's C/I must be greater than or equal to $(C/I)_{min}$ with the excess transmit power.

If new users have a medium priority, the system always allows the new users, assigning them a minimum amount of power which allows them to reach the minimum nonzero MCR. After a given time, they can be treated as equal. This case is of particular interest for hand-off procedures, in order to avoid a forced link removal for an ongoing call. If new users have a high priority, the system always allows the new users and assigns them a specified grade of service. After a given time, they can be treated as equal. This guarantees that a user does not experience a loss of grade of service while in a hand-off procedure.

The present invention may also adjust for signal quality changes which typically result from movement of the users, changes in interference, or changes in the propagation environment. Several exemplary methods for handling signal quality changes in accordance with the present invention will now be provided. In a preferred method, whenever a significant change occurs in one or more of the link qualities, the link adaptation procedure is re-run on the whole set of planned links. As a second method, the initial step of the selected link adaptation procedure is run only once (computation of the signal quality of each user in the case of equally distributed transmission power). Whenever a significant change occurs in one or more of the link qualities, the MCRs are updated, and the excess system resources are recalculated and distributed. Since these methods do not accommodate link admissions/removals, they may preferably be combined with the link admission/removal methods in order to provide an effective solution.

Although the link adaptation methods in accordance with the present invention have been described primarily from the perspective of the downlink (i.e., base station to subscriber unit link) of a cellular system, the principles of the present invention are also applicable to the uplink The main difference between the two is as follows: the downlink is a one-to-many configuration, while the uplink is a many-to-one configuration. As a result, the downlink allocates a portion of the total base station transmit power to each link. However, in the uplink, each user has a separate power amplifier, so the links of the uplink are not sharing a single "pool" of power. Therefore, in the methods of the present invention, the allocation of the reference transmit power $P_T/N$ to each user applies to the downlink, and on the uplink a different concept of reference transmit power is used.

Nevertheless, the APA methods with adaptive modulation/coding in accordance with the present invention can be applied to the uplink. In one example, the base station may have a target received power level for the users of the uplink, which the users meet by uplink power control. In this case, the C/I will depend on the loading in surrounding cells and the frequency reuse pattern. Adaptive modulation/coding can be applied to optimize the MCR for the current conditions. In another example, the base station may determine a target zone for all the link qualities. The APA method will aim at setting the transmit power so that a given user reaches the signal quality target zone, and then let the signal quality fluctuate, as long as it remains between the signal quality boundaries.

The methods of the present invention may be advantageously applied to a code division multiple access (CDMA) or time division multiple access (TDMA) system with more than one modulation rate or more than one coding rate, such as evolutions of cdma2000 or Wideband CDMA (WCDMA). In addition, the methods of the present invention could be applied to a fourth generation fixed or mobile broadband wireless system that incorporates Orthogonal Frequency Division Multiplexing (OFDM).

The methods in accordance with the present invention can be applied as frequently as is desired and practical. The system can attempt to track short term variations in link quality (e.g., short-term fading, such as Rayleigh fading), medium term variations (averaged over short-term fading, but not shadowing), or long term variations (averaged over both short-term fading and shadowing). The speed at which the adaptation can occur is determined mostly by the ability to track the variations and to report the variations back to the base station in a timely fashion.

When some of the channel resources (e.g., time slots or codes) are not in use in the cell, the power that would normally be allocated to these channel resources can be treated as extra available power. This extra power can be allocated to the active links based on a system criterion. Alternatively, the unused channel resources can be assigned to one or more of the active links before applying one of the methods.

The new link adaptation methods typically attempt to achieve an exact desired signal quality, or a signal quality in a specified range. In order to improve robustness to measurement errors and the like, a tolerance parameter $\delta$ can be introduced in the methods. For example, the tolerance parameter can be introduced into the APA methods in accordance with the present invention to allow a tolerance around the target power level, or link quality (e.g., C/I).

Different links may have different link degradation factors (using the Shannon Limit as a reference) due to different multipath fading profiles. This means that the same C/I value on two different links may represent two different link qualities. In this case, the link quality difference can be accommodated in various ways. One way is to calibrate the mapping between link quality and a measured parameter such as C/I for each user. This calibration may be time varying, since propagation conditions can change over time. The new link adaptation methods can still be applied as long as valid link quality estimates are available. For example, if C/I is measured and calibrated to true link quality by a mapping from $(C/I)_{measured}$ to $(C/I)_{corrected}$, then $(C/I)_{corrected}$ can be used in the link adaptation methods. In general, the link adaptation methods can be reformulated in terms of whatever link quality parameter is deemed most appropriate (e.g., decoded bit error rate, word error rate, C/(I+Noise+Distortion), etc.). Different degradation factors can be used for the different MCR levels to account for unequal modulation implementation losses or channel coding variation.

In CDMA systems, a multipath channel introduces additional "interference" from the non-orthogonality of the time-shifted spreading codes. This can be accommodated in the link adaptation methods by including the power of this extra interference in the C/I values. In this case, attempting to assign all N channel resources (i.e., spreading codes) might not maximize the system capacity because of the extra interference buildup. The new methods can be reformulated to accommodate operation using only a fraction of the N channel resources. Then the performance can be compared between the full and fractional channel resource assignment approaches and the best method can be selected on a case-by-case basis.

The different methods in accordance with the present invention can be combined when beneficial. Link, or signal, quality can be measured based on a pilot signal, training, or synchronization signal for an idle or active user, or can be based on measured BER/WER for active users. In addition, the methods of the present invention may be implemented in hardware, such as field programmable gate arrays (FPGAs) or Application Specific Integrated Circuits (ASICS), or in software, such as in digital signal processors, or any combination thereof.

In the previous discussion, it was assumed the link adaptation methods were applied to all the users. However, it is possible to consider that one set of users having a fixed rate is present in the system. In this case, the total transmit power is split between the 2 groups in the downlink, and the power allocation methods can be performed only on the subset of users that are allowed to adapt their links. More generally, it is possible to split the set of users into different subsets, each one using a different link adaptation method. The split of users into different subsets can be applied to the downlink, the uplink, or both.

The new link adaptation methods are applicable when the size of a system resource takes on one of a discrete, finite set of values. The initial resource size and the excess resources distributed may be constrained to some multiple of a system minimum resource size.

The new link adaptation methods of the present invention are also applicable to the case where multiple channel resources (such as multiple codes or multiple time slots) are assigned to a particular user. In this case, the multiple channel resources can be modeled as being assigned to different users that have identical link qualities for the purpose of using the methods of the invention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives failing within the spirit and scope of the invention as defined by the following appended claims.

What is claimed is:

1. A method for transmitting signals in a communication system comprising the steps of:

determining a reference signal quality associated with a reference transmit power for each planned link of a plurality of planned links in the communication system to produce a plurality of reference signal qualities;

determining a target signal quality for each planned link of the plurality of planned links based on the plurality of reference signal qualities and on a system criterion that incorporates an ability of the system to support variable modulation/coding rates;

selecting a combination of a transmit power and a modulation/coding rate for each planned link of the plurality of planned links based on the target signal quality associated with the planned link and a set of possible modulation/coding rates; and assigning the selected transmit powers and modulation/coding rates to each of the corresponding planned links.

2. The method as recited in claim 1 wherein the step of determining a target signal quality comprises the step of choosing a common target signal quality for each planned link of the plurality of planned links based on the plurality of reference signal qualities and on the system criterion.

3. The method as recited in claim 1 wherein the step of selecting a combination of a transmit power and a modulation/coding rate for each planned link comprises the step of selecting a common modulation/coding rate for all planned links of the plurality of planned links in the system.

4. The method as recited in claim 3 wherein the common modulation/coding rate is selected from a finite set of modulation/coding rates.

5. The method as recited in claim 1 wherein the signal quality is a bit error rate.

6. The method as recited in claim 1 wherein the signal quality is a carrier to interference ratio.

7. The method as recited in claim 1 wherein the signal quality is a carrier to interference plus noise ratio.

8. The method as recited in claim 1 wherein the signal quality is a ratio of wanted to unwanted signal energy.

9. The method as recited in claim 1 wherein the reference transmit power is a total system transmit power divided by a number of planned links.

10. The method as recited in claim 1 wherein the plurality of planned links comprises currently active links and wherein the reference transmit power for a planned link is the transmit power currently assigned to the active link.

11. In a wireless communication system, a method for transmitting signals comprising the steps of:

determining a reference signal quality associated with a reference transmit power for each planned link of a plurality of planned links to produce a plurality of reference signal qualities;

determining a target signal quality for each planned link of the plurality of planned links based on the plurality of reference signal qualities and a system criterion that incorporates an ability of the system to support variable modulation/coding rates;

determining a minimum desired signal quality and a maximum desired signal quality for the plurality of planned links based on one or more system criteria;

selecting a combination of a transmit power and a modulation/coding rate for each planned link of the plurality of planned links based on the target signal quality determined for the planned link, a set of modulation/coding rates, and the minimum and maximum desired signal qualities; and assigning the determined transmit powers and modulation/coding rates to each of the corresponding planned links.

12. The method as recited in claim 11 wherein the step of selecting comprises the steps of:
   if the target signal quality of one of the planned links is less than or equal to the minimum desired signal quality, selecting a smallest possible transmit power as the transmit power for the one of the planned links such that the signal quality of the one of the planned links when transmitted is greater than, or equal to the minimum desired signal quality;
   if the target signal quality of the one of the planned links is greater than or equal to the maximum desired signal quality, and if there is enough dynamic range, selecting a greatest possible transmit power as the transmit power for the one of the planned links such that the signal quality of the one of the planned links when transmitted is lower than, or equal to the maximum desired signal quality;
   if the target signal quality of the one of the planned links is greater than or equal to the maximum desired signal quality, and if there is not enough dynamic range such that the signal quality of the one of the planned links when transmitted is lower than, or equal to the maximum desired signal quality, selecting a minimum strictly positive power value for the transmit power for the one of the planned links; and
   if the target signal quality of the one of the planned links is greater than the minimum desired signal quality and less than the maximum desired signal quality, selecting a transmit power for the one of the planned links such that the signal quality of the one of the planned links is as close as possible to the target signal quality.

13. The method as recited in claim 12 comprising the step of:
   if there is not enough dynamic range to select a transmit power of a planned link such that the signal quality of the planned link, when transmitted, is greater than or equal to the minimum desired signal quality, removing that planned link from the plurality of planned links.

14. The method as recited in claim 11 wherein the signal quality is a carrier to interference ratio.

15. The method as recited in claim 11 wherein the signal quality is bit error rate.

16. In a wireless communication system, a system for transmitting signals comprising:
   a transmit power unit for determining a reference transmit power for each planned link of a plurality of planned links and for determining a transmit power for the planned link based on the reference transmit power, a target signal quality determined by a signal quality unit, and a set of possible modulation/coding rates;
   a signal quality unit for determining a reference signal quality associated with the reference transmit power determined for each planned link of the plurality of planned links to produce a plurality of reference signal qualities and for determining a target signal quality for each planned link of the plurality of planned links based on the plurality of reference signal qualities and on a system criterion that incorporates an ability of the system to support variable modulation/coding rates;
   a modulation/coding rate unit for assigning a modulation/coding rate to each planned link of the plurality of planned links based on the target signal quality associated with the planned link and the transmit power determined for the planned link; and
   a transceiver unit for transmitting each planned link of the plurality of planned links at the transmit power determined for the planned link and with the modulation/coding rate assigned to the planned link.

17. The system as recited in claim 16 wherein the target signal quality for each of the planned links is a common target signal quality for all of the planned links, and wherein the modulation/coding rate unit assigns a common modulation/coding rate to all planned links based on the target signal quality.

18. The system as recited in claim 16 wherein the signal quality unit comprises:
   a range unit for determining minimum and maximum desired signal qualities for the planned links, and for determining the target signal quality for each of the planned links based on one or more system criteria, and
   wherein the transmit power unit selects the transmit power for each of the planned links based on the minimum and maximum desired signal qualities and the target signal quality of each of the planned links.

19. The system as recited in claim 18 wherein the transmit power unit comprises:
   a power selection unit for selecting a smallest possible transmit power as the transmit power for one of the planned links such that the signal quality of the one of the planned links when transmitted is greater than or equal to the minimum desired signal quality, if the target signal quality of the one of the planned links is less than or equal to the minimum desired signal quality; for selecting a largest possible transmit power as the transmit power for the one of the planned links such that the signal quality of the one of the planned links when transmitted is lower than or equal to the maximum desired signal quality if the power selection unit has enough dynamic range and if the target signal quality of the one of the planned links is greater than or equal to the maximum desired signal quality; for selecting a minimum strictly positive possible value for the transmit power for the one of the planned links if the selection unit does not have enough dynamic range such that the signal quality of the one of the planned links when transmitted is lower than or equal to the maximum desired signal quality and if the target signal quality of the one of the planned links is greater than or equal to the maximum desired signal quality; and for selecting a transmit power for the one of the planned links such that the signal quality of the one of the planned links is as close as possible to the target signal quality, if the target signal quality of the one of the planned links is greater than the minimum desired signal quality and less than the maximum desired signal quality.

20. The system as recited in claim 19, wherein the power selection unit, if there is not enough dynamic range to select a transmit power of a planned link such that the signal quality of the planned link, when transmitted, is greater than or equal to the minimum desired signal quality, removes that planned link from the plurality of planned links.

* * * * *